Aug. 19, 1952 P. L. MORTON 2,607,276
FARM IMPLEMENT LIFT AND FRAME
Filed April 19, 1948
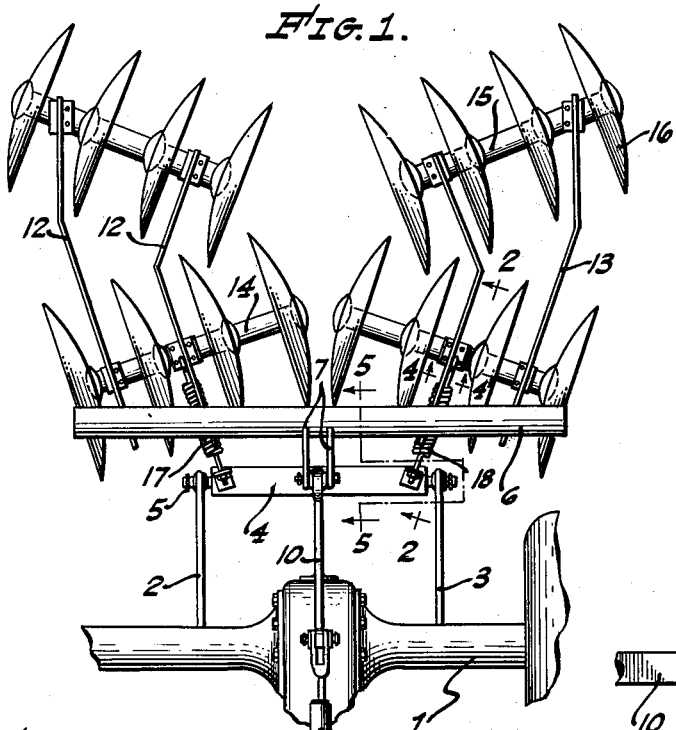
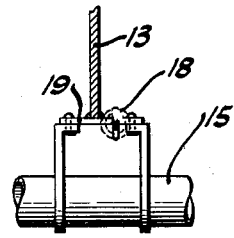
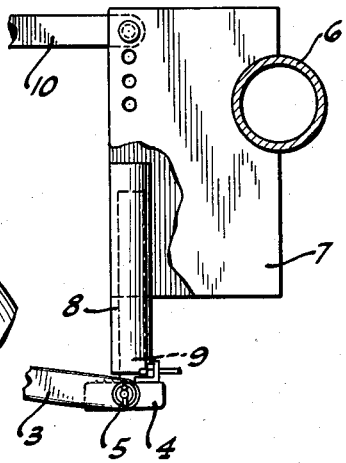
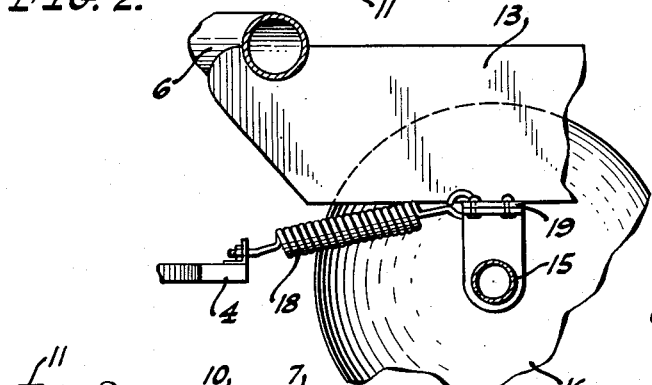
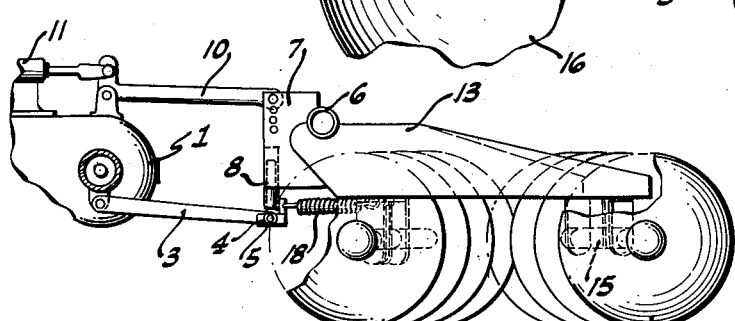
INVENTOR
PAUL L. MORTON
BY
ATTORNEY Patented Aug. 19, 1952

2,607,276

UNITED STATES PATENT OFFICE 2,607,276

FARM IMPLEMENT LIFT AND FRAME

Paul L. Morton, Long Beach, Calif.

Application April 19, 1948, Serial No. 21,822

4 Claims. (Cl. 97—47)

1

This invention relates to a novel lift and frame for a farm implement such as a disc harrow, cultivator, or plow.

An object of my invention is to provide a novel lift and frame for a farm implement which will enable the implement to be elevated above the ground surface for purposes of transportation when this operation is necessary.

Another object of my invention is to provide a novel lift and frame for farm implements providing a spring draft means so that the implement can move in an arc behind the pulling tractor, and without causing undue strain or tension on the frame.

Still another object is to provide a novel lift and frame for farm implements, which is simple in construction and effective in operation.

A feature of my invention is to provide a novel lift and frame for farm implements in which a novel means is provided for attaching the draft bar to the main tubular frame of the implement.

Other objects, advantages and features of invention may appear from the accompanying drawing, the subjoined detailed description, and the appended claims.

In the drawing:

Figure 1 is a top plan view of my lift and frame for farm implements.

Figure 2 is a fragmentary view taken on line 2—2, of Figure 1.

Figure 3 is a side elevation of my lift and frame for farm implements.

Figure 4 is a fragmentary sectional view taken on line 4—4 of Figure 1.

Figure 5 is a fragmentary sectional view taken on line 5—5 of Figure 1.

Referring more particularly to the drawing, my lift and frame for farm implements is used preferably in connection with a tractor, in which the drag links are fixedly attached to the tractor, and in this connection, the tractor 1, is provided with two drag links 2, 3, which are pivotally atached to the rear axle of the tractor with limited pivotal movement, or otherwise attached to the tractor. A drag bar 4, is a transverse member provided with a pin 5, on each end, to which the links 2 and 3, are attached. It will be evident that the drag bar 4, will follow the movement of the tractor 1, as the tractor may move from side to side under the guidance of the operator. The drag links 2, 3, are rigid, and consequently, the drag link 4, will accurately follow the position of the rear axle of the tractor.

A tubular frame member 6, is positioned rearwardly and somewhat above the drag bar 4, and this tube is connected to the drag bar 4, in the following manner: a pair of spaced vertical plates 7—7, are fixedly attached to the tube 6. A sleeve 8, is fixedly attached between the plates 7—7, and a pin 9, rises from the drag bar 4, and is journaled in the sleeve 8. Thus, the tube 6, can rotate around the pin 9, and therefore move relative to the drag bar 4. A connecting rod 10, is pivotally attached to the plates 7, and this rod is connected to the hydraulic cylinder 11, which is mounted on the tractor, and is a part thereof. Thus, the operator can actuate the hydraulic cylinder 11, and can then lift the implement vertically by swinging the implement on the drag links 3, these drag links acting as arms in the vertical movement of the farm implement.

A pair of frame plates 12—12, and 13—13, extend rearwardly from the tube 6, and are fixedly attached to the tube. The disc axles 14—14, and 15—15, are secured to the frame members 12, 13, respectively, and the various discs 16, are journaled on these axles. To cause the implement to track accurately, behind the tractor, I provide a spring coupling as follows: springs 17—18, are attached at one end to the drag bar 4, and adjacent each end of this drag bar, substantially as shown. The other ends of these springs are connected to a suitable fixture on the axles 14, or on the frame members 12, or 13. This fixture may consist of a plate 19, which is welded, or otherwise attached to the frame plates 12, or 13. The spring 17 or 18 can then be hooked into this plate, thus providing a spring tension which will yieldably drag the farm implement behind the tractor, and these springs particularly will operate when the tractor is moving a curve.

The springs are strong enough to exert a considerable force tending to hold the tube 6, parallel with the drag bar 4, at all times. However, the force of these springs can be overcome and the implement will turn on the pivot 9, rather than to slide horizontally as would be the case if the implement were fixedly attached to the tractor. The pin 9 cannot drop out of the sleeve 8 due to the upward pull of the springs 17—18, and also since the arms 2—3 have a limited pivotal movement around the pivotal connection to the tractor. This pivotal connection to the tractor is usual and well known in the art.

Having described my invention, I claim:

1. A farm implement lift and frame, comprising a horizontal drag bar, a drag link attached to each end of the drag bar, a horizontal implement frame member, a pin rising from the drag bar, a sleeve journaled on the pin, means fixedly attaching said sleeve to the implement frame member, and yieldable means conecting the drag bar and the implement frame.

2. A farm implement lift and frame, comprising a horizontal drag bar, a drag link attached to each end of the drag bar, a horizontal implement frame member, a pin rising from the drag bar, a sleeve journaled on the pin, means fixedly attaching said sleeve to the implement frame member, and yieldable means connecting the drag bar, and the implement frame, said yieldable means consisting of a spring mounted on each end of the drag bar, the other end of the spring being attached to the implement frame.

3. A farm implement lift and frame, comprising a horizontal drag bar, a drag link attached to each end of the drag bar, a horizontal implement frame member, a pair of plates projecting from the frame member, a tube fixedly attached to said plates, a pin rising from the drag bar and journaled in the tube, and spring means connecting each end of the drag bar and the implement frame.

4. A farm implement lift and frame, comprising a horizontal drag bar, a drag link attached to each end of the drag bar, a horizontal implement frame member, a pair of plates projecting from the frame member, a tube fixedly attached to said plates, a pin rising from the drag bar and journaled in the tube, a spring attached to the drag bar adjacent each end thereof, and the other end of said springs being attached to the implement frame.

PAUL L. MORTON.

REFERENCES CITED

The following references are of record in the file of this patent:

UNITED STATES PATENTS

| Number | Name | Date |
| --- | --- | --- |
| 1,313,451 | Behlen | Aug. 19, 1919 |
| 2,092,597 | Benjamin et al. | Sept. 7, 1937 |
| 2,193,157 | Ayo | Mar. 12, 1940 |
| 2,247,534 | Von Schlegell | July 1, 1941 |
| 2,320,141 | Kott | May 25, 1943 |
| 2,336,848 | Cruse | Dec. 14, 1943 |
| 2,345,741 | Foulke | Apr. 4, 1944 |
| 2,395,322 | Evans | Feb. 19, 1946 |
| 2,453,723 | Palmer et al. | Nov. 16, 1948 |

FOREIGN PATENTS

| Number | Country | Date |
| --- | --- | --- |
| 157,852 | Switzerland | Dec. 16, 1932 |